(12) United States Patent
Kita

(10) Patent No.: US 9,524,068 B2
(45) Date of Patent: Dec. 20, 2016

(54) LIQUID CRYSTAL DISPLAY DEVICE

(71) Applicant: Panasonic Liquid Crystal Display Co., Ltd., Himeji-shi, Hyogo (JP)

(72) Inventor: Kazuo Kita, Osaka (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 89 days.

(21) Appl. No.: 14/510,837

(22) Filed: Oct. 9, 2014

(65) Prior Publication Data

US 2015/0022501 A1 Jan. 22, 2015

Related U.S. Application Data

(63) Continuation of application No. PCT/JP2013/003022, filed on May 10, 2013.

(30) Foreign Application Priority Data

May 25, 2012 (JP) ................................ 2012-119443

(51) Int. Cl.
*G06F 3/044* (2006.01)
*G02F 1/1333* (2006.01)
(Continued)

(52) U.S. Cl.
CPC ............ *G06F 3/044* (2013.01); *G02F 1/13338* (2013.01); *G02F 1/134363* (2013.01); *G06F 3/0412* (2013.01); *G06F 2203/04111* (2013.01)

(58) Field of Classification Search
CPC .................. G06F 3/0412; G06F 3/044; G06F 2203/04111; G02F 1/13338; G02F 1/134363
See application file for complete search history.

(56) References Cited

U.S. PATENT DOCUMENTS

2008/0062147 A1 3/2008 Hotelling et al.
2008/0062148 A1* 3/2008 Hotelling ............ G02F 1/13338
345/174
(Continued)

FOREIGN PATENT DOCUMENTS

JP 2000-099268 4/2000
JP 2009-540374 11/2009
(Continued)

OTHER PUBLICATIONS

Office Action issued in related U.S. Appl. No. 14/510,788, Mar. 11, 2016, 12 pages.

*Primary Examiner* — Dwayne Bost
*Assistant Examiner* — Maheen Javed
(74) *Attorney, Agent, or Firm* — Hamre, Schumann, Mueller & Larson, P.C.

(57) ABSTRACT

To achieve improved detection accuracy and position resolution in an in-cell type capacitive touch sensor embedded in a liquid crystal panel of a liquid crystal display device, a drive electrode of a touch sensor is formed of a transparent conductive film laminated on a surface of a TFT substrate on a liquid crystal side below a pixel electrode, and disposed in a region between gate lines. A detection electrode is formed of a transparent conductive film laminated on an outward-directed surface of the TFT substrate. A drive signal is supplied to the drive electrode to cause a voltage change, and based on the voltage change in the detection electrode caused thereby, a capacitance change in an opposing part between the drive electrode and the detection electrode is detected, to thereby detect contact of an object to a display surface near the opposing part in a liquid crystal panel.

12 Claims, 9 Drawing Sheets

(51) Int. Cl.
   *G02F 1/1343*   (2006.01)
   *G06F 3/041*   (2006.01)

(56)          References Cited

U.S. PATENT DOCUMENTS

2010/0001973 A1    1/2010  Hotelling et al.
2010/0289765 A1   11/2010  Noguchi et al.
2011/0285640 A1*  11/2011  Park .................... G02F 1/13338
                                                           345/173
2012/0162104 A1    6/2012  Change et al.
2012/0249454 A1*  10/2012  Teraguchi ............. G06F 3/0412
                                                           345/173
2012/0274603 A1*  11/2012  Kim ...................... G06F 3/0412
                                                           345/174
2013/0044074 A1*   2/2013  Park .................... G02F 1/13338
                                                           345/174
2013/0194224 A1*   8/2013  Lai ........................ G06F 3/0412
                                                           345/174
2013/0293513 A1   11/2013  Hotelling et al.
2014/0139484 A1    5/2014  Hotelling et al.
2014/0247247 A1    9/2014  Hotelling et al.

FOREIGN PATENT DOCUMENTS

JP         2010-267222       11/2010
JP         2011-227923       11/2011
JP         2011-527787       11/2011
JP         2011-257655       12/2011

* cited by examiner

LIQUID CRYSTAL DISPLAY DEVICE

CROSS-REFERENCE TO RELATED APPLICATION

The present application is a Bypass Continuation of International Application No. PCT/JP2013/003022, filed on May 10, 2013, which claims priority from Japanese Patent application JP2012-119443 filed on May 25, 2012. The contents of these applications are hereby incorporated into the present application by reference in their respective entireties.

TECHNICAL FIELD

The present invention relates to a liquid crystal display device having a touch sensor function, and more particularly, to a technology of embedding a capacitive touch sensor into a liquid crystal panel.

BACKGROUND

In recent years, a liquid crystal display device having the following structure has been put into practical use. That is, a touch panel configured to enable a user to operate and input information by touching an image display surface with his/her finger or the like is externally mounted to a front surface side of a liquid crystal panel. Further, a structure of embedding a touch sensor function into the liquid crystal panel has also been proposed. The system of embedding the touch sensor function into the liquid crystal panel may be classified into an on-cell type and an in-cell type. In the on-cell type, a layer having a touch sensor function is formed between a polarizing plate and a glass substrate on which a color filter is formed of the liquid crystal panel. In the in-cell type, a touch sensor is formed in a thin film transistor (TFT) substrate of the liquid crystal panel during a manufacturing process for the substrate. Achieving the in-cell touch sensor function enables reduction in thickness and weight of the liquid crystal display device.

As a related-art liquid crystal display device having an in-cell touch sensor function embedded therein, there has been proposed a configuration in which, among pixel electrodes and a common electrode used for applying an electric field to liquid crystal, the common electrode doubles as a drive electrode of a capacitive touch sensor.

SUMMARY

When an electrode used for drive of pixels of the liquid crystal panel doubles as an electrode of the capacitive touch sensor, there has been a problem in that the touch sensor operation and the pixel drive may interfere with each other to cause problems in those operations. In view of this, when a video signal is provided with a blank period in which the pixel display operation is not performed, such as a vertical blanking period, it is conceivable to detect contact during the blank period so as to avoid interference between the touch sensor operation and the pixel drive. However, the blank period is generally short. Therefore, when the contact is detected at a plurality of points arrayed over a display surface in a time division manner, as the number of the points increases, time assigned to each of the points is reduced, which may reduce the accuracy of detecting capacitance change. Therefore, there has been a problem in that it is difficult to perform highly accurate contact detection with high position resolution.

The present invention has been made to solve the above-mentioned problems, and has an object to prevent, in a liquid crystal display device having a touch sensor function embedded in a liquid crystal panel, interference between the touch sensor operation and the pixel drive and to improve detection accuracy and time resolution of the touch sensor function.

According to one embodiment of the present invention, there is provided a liquid crystal display device including: a liquid crystal panel in which liquid crystal is sandwiched between a front substrate and a back substrate arranged so as to oppose each other, the front substrate having an outward-directed surface as a display surface of an image, the liquid crystal display device being configured to: sequentially apply a selection signal to scanning wiring lines laminated on a surface of the front substrate on the liquid crystal side and respectively extended along a plurality of pixel rows forming the image, to thereby enable application of a voltage based on a video signal to each pixel electrode of corresponding one of the plurality of pixel rows; and control alignment of the liquid crystal by an electric field generated between the pixel electrode and a common electrode, to thereby form the image; and a capacitive touch sensor including: a plurality of first electrodes formed of a transparent conductive film laminated on the surface of the front substrate on the liquid crystal side below the pixel electrode, the plurality of first electrodes being formed in regions between the scanning wiring lines; a plurality of second electrodes formed of a transparent conductive film laminated on the outward-directed surface of the front substrate; and a contact detection circuit configured to, when one of each of the plurality of first electrodes and each of the plurality of second electrodes is defined as a drive electrode and another thereof is defined as a detection electrode: supply a drive signal to the drive electrode to cause a voltage change; detect, based on the voltage change in the detection electrode caused by the supply, a change in capacitance in an opposing part between corresponding one of the plurality of first electrodes and corresponding one of the plurality of second electrodes; and detect contact of an object to the display surface near the opposing part.

In one preferred aspect of the liquid crystal display device according to the present invention, the common electrode is formed of a transparent conductive film laminated between the pixel electrode and the first electrodes, and the first electrodes include the drive electrode and cover the regions between the scanning wiring lines.

In one preferred aspect of the liquid crystal display device according to the present invention, the contact detection circuit operates to detect the contact of the object in an effective display period of the video signal.

In one preferred aspect of the liquid crystal display device according to the present invention, the plurality of first electrodes extends in a first direction along the display surface, and the plurality of second electrodes extends in a second direction different from the first direction along the display surface, the plurality of first electrodes and the plurality of second electrodes forming the opposing parts at a plurality of positions arrayed two-dimensionally in the display surface, and the contact detection circuit is further configured to sequentially supply the drive signal to a plurality of the drive electrodes to examine the voltage change in each of the detection electrodes, to thereby determine a position at which the object is brought into contact in the display surface.

According to another embodiment of the present invention, there is provided a liquid crystal display device including: a liquid crystal panel in which liquid crystal is sandwiched between a front substrate and a back substrate arranged so as to oppose each other, the front substrate having an outward-directed surface as a display surface of an image, the liquid crystal display device being configured to: sequentially apply a selection signal to scanning wiring lines laminated on a surface of the front substrate on the liquid crystal side and respectively extended along a plurality of pixel rows forming the image, to thereby enable application of a voltage based on a video signal to each pixel electrode of corresponding one of the plurality of pixel rows; and control alignment of the liquid crystal by an electric field generated between the pixel electrode and a common electrode, to thereby form the image; and a capacitive touch sensor including: a plurality of drive electrodes formed of a transparent conductive film laminated on the surface of the front substrate on the liquid crystal side below the pixel electrode, the plurality of drive electrodes being electrically connected to the scanning wiring lines, respectively; a plurality of detection electrodes formed of a transparent conductive film laminated on the outward-directed surface of the front substrate; and a contact detection circuit configured to detect a change in capacitance in an opposing part between corresponding one of the plurality of drive electrodes and corresponding one of the plurality of detection electrodes based on a voltage change in the corresponding one of the plurality of detection electrodes caused via the corresponding one of the plurality of drive electrodes when the selection signal is applied to corresponding one of the scanning wiring lines, to thereby detect contact of an object to the display surface near the opposing part.

In one preferred aspect of the liquid crystal display device according to the present invention, the common electrode is formed of a transparent conductive film laminated on the surface of the front substrate on the liquid crystal side below the pixel electrode, and the drive electrodes cover regions between the scanning wiring lines.

In one preferred aspect of the liquid crystal display device according to the present invention, the plurality of drive electrodes extends in a horizontal direction in the display surface, and the plurality of detection electrodes extends in a vertical direction in the display surface, the plurality of drive electrodes and the plurality of detection electrodes forming the opposing parts at a plurality of positions arrayed two-dimensionally in the display surface, and the contact detection circuit is further configured to examine the voltage change in the each of the plurality of detection electrodes when the selection signal is sequentially applied to the scanning wiring lines through vertical scanning of the image, to thereby determine a position at which the object is brought into contact in the display surface.

In the liquid crystal display device according to yet another embodiment of the present invention, the detection electrodes are formed into mesh shape.

According to one embodiment of the present invention, with the liquid crystal display device devised to achieve the in-cell touch sensor function, the pixel electrode and the common electrode relating to pixel display are arranged closer to the surface of the substrate on the liquid crystal side, and the drive electrode and the detection electrode of the touch sensor are arranged closer to the surface of the substrate on the side opposite to the liquid crystal. Thus, it is possible to prevent interference between the touch sensor operation and the pixel drive, and to perform contact detection independently of the drive of the cell of the liquid crystal panel. With this, the limitation on the period, in which the contact can be detected, is relaxed, and further improved detection accuracy and position resolution can be achieved in contact detection.

DETAILED DESCRIPTION

Now, a liquid crystal display device 2 and a liquid crystal display device 200 that are modes for carrying out the present invention (hereinafter referred to as "embodiments") are described with reference to the drawings.

Each of the liquid crystal display devices 2 and 200 includes a liquid crystal panel having a capacitive touch sensor embedded therein. Description is made of the principle of contact detection (touch detection) in the capacitive touch sensor used in this embodiment. On a display surface side of the liquid crystal panel, a drive electrode and a detection electrode that are insulated from each other are laminated as electrodes for contact detection. The drive electrode and the detection electrode each have a part opposing each other, and the capacitance of the opposing part is represented by C0. The drive electrode is supplied with, for example, a rectangular pulse or the like from an AC signal source, while the detection electrode is grounded via a resistor R and is also connected to a voltage detection circuit.

When an AC signal is applied to the drive electrode, a voltage change occurs in the detection electrode due to capacitive coupling. In other words, under a state in which an object such as a finger is not brought into contact with the display surface above the opposing part of the drive electrode and the detection electrode, a current corresponding to charge or discharge of the capacitance C0 flows through the resistor R, and a voltage V0 is generated in the resistor R.

On the other hand, when an object such as a finger is brought into contact with the display surface above the opposing part, a capacitance C1 is generated between the object and the detection electrode. Therefore, the voltage change in the detection electrode when an AC signal is applied to the drive electrode is smaller than the voltage V0 obtained when the object is not in contact. In other words, under a state in which an object that may be regarded as a ground potential is brought into contact, C0 and C1 are connected in series between the ground potential and the AC signal source. Under this state, as viewed from the detection electrode, a current I1 caused by charge or discharge of the capacitance C1 flows in a direction opposite to that of a current I0 caused by charge or discharge of the capacitance C0. Therefore, the current flowing through the resistor R is reduced as compared to that when the object is not in contact. As a result, a voltage V1 generated in the resistor R is smaller than V0.

The voltage detection circuit is configured to determine the difference of those voltages with use of a preset threshold value. The contact of an object can be detected based on an output signal of the voltage detection circuit.

First Embodiment

Figure 1:
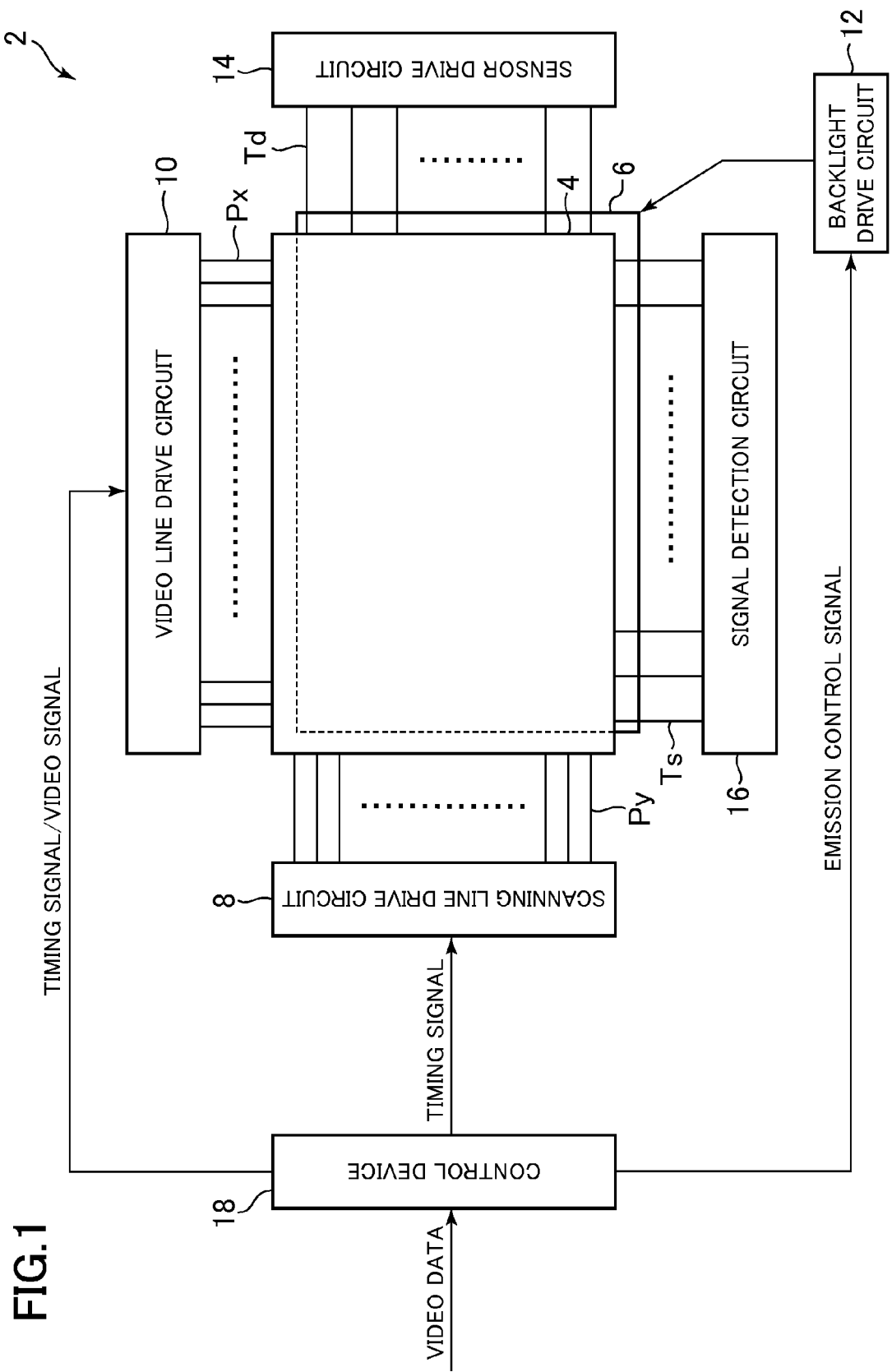
FIG. 1 is a schematic view illustrating a configuration of a liquid crystal display device according to a first embodiment of the present invention.

FIG. 1 is a schematic view illustrating a configuration of the liquid crystal display device 2 according to a first embodiment of the present invention. As illustrated in FIG. 1, the liquid crystal display device 2 includes a liquid crystal panel 4, a backlight unit 6, a scanning line drive circuit 8, a video line drive circuit 10, a backlight drive circuit 12, a sensor drive circuit 14, a signal detection circuit 16, and a control device 18.

The liquid crystal panel 4 includes a TFT substrate, an opposing substrate, liquid crystal sandwiched therebetween and the like, and has a substantially rectangular planar shape. The TFT substrate and the opposing substrate are each manufactured with use of a transparent glass substrate. The TFT substrate is positioned on the back surface side of the liquid crystal panel 4. On a surface of the glass substrate forming the TFT substrate, TFTs arranged in matrix so as to correspond to a pixel arrangement and the like are formed in a laminated manner. Further, the opposing substrate is positioned on the front surface side of the liquid crystal panel 4. A color filter (CF) and the like are formed in a laminated manner on a surface of the glass substrate forming the opposing substrate. Note that, in this embodiment, a drain and a source are defined assuming that the TFT formed in each pixel in the TFT substrate is an n-channel TFT.

In the TFT substrate, a plurality of video signal lines Px and a plurality of scanning signal lines Py are formed so as to be substantially orthogonal to each other. Each of the scanning signal lines Py is provided for each horizontal row of the TFTs, and is connected in common to gates of a plurality of TFTs in the corresponding horizontal row. Each of the video signal lines Px is provided for each vertical column of the TFTs, and is connected in common to drains of a plurality of TFTs in the corresponding vertical column. Further, a source of each TFT is connected to a pixel electrode arranged in a pixel region corresponding to the TFT.

The turning on and off of the respective TFTs is controlled on a horizontal row basis based on a scanning signal applied to the scanning signal line Py. Each of the TFTs in the horizontal row in an on state sets the pixel electrode to a potential (pixel voltage) corresponding to a video signal applied to the video signal line Px. The liquid crystal panel 4 is configured to control the alignment of the liquid crystal for each pixel region based on an electric field generated between the pixel electrode and a common electrode, and change the transmittance with respect to light entering from the backlight unit 6, to thereby form an image on the display surface.

The backlight unit 6 is disposed on the back surface side of the liquid crystal panel 4, and is configured to irradiate the back surface of the liquid crystal panel 4 with light. For example, the backlight unit 6 uses a plurality of light emitting diodes (LEDs) as a light source.

The scanning line drive circuit 8 is connected to the plurality of scanning signal lines Py formed in the TFT substrate. The scanning line drive circuit 8 is configured to sequentially select the scanning signal line Py based on a timing signal input from the control device 18, and apply a voltage for turning on the TFTs to the selected scanning signal line Py. For example, the scanning line drive circuit 8 includes a shift register. The shift register is configured to start an operation in response to a trigger signal from the control device 18, sequentially select the scanning signal line Py in order along the vertical scanning direction, and output a scanning pulse to the selected scanning signal line Py.

The video line drive circuit 10 is connected to the plurality of video signal lines Px formed in the TFT substrate. The video line drive circuit 10 is configured to apply a voltage corresponding to a video signal representing a grayscale value of each pixel to each of the TFTs connected to the selected scanning signal line Py in synchronization with the selection of the scanning signal line Py by the scanning line drive circuit 8. With this, the video signal is written into the pixel corresponding to the selected scanning signal line Py. This operation corresponds to horizontal scanning in raster graphics. By the way, the above-mentioned operation of the scanning line drive circuit 8 corresponds to vertical scanning.

The backlight drive circuit 12 causes the backlight unit 6 to emit light at a timing and brightness based on an emission control signal input from the control device 18.

In the TFT substrate of the liquid crystal panel 4, as electrodes for a touch sensor, a plurality of drive electrodes Td and a plurality of detection electrodes Ts are formed so as to be substantially orthogonal to each other. In this embodiment, the respective drive electrodes Td are extended in a row direction (horizontal direction) of the pixel arrangement. On the other hand, the respective detection electrodes Ts are extended in a column direction (vertical direction) of the pixel arrangement. The sensor drive circuit 14 and the signal detection circuit 16 are provided as a contact detection circuit configured to perform electric signal input and response detection between those drive electrodes and detection electrodes to detect the contact of an object to the display surface.

The sensor drive circuit 14 is the above-mentioned AC signal source, and is connected to the drive electrode group. For example, the sensor drive circuit 14 is configured to receive a timing signal from the control device 18, sequentially select the drive electrode Td in synchronization with the image display of the liquid crystal panel 4, and supply a rectangular pulse to the selected drive electrode. For example, similarly to the scanning line drive circuit 8, the sensor drive circuit 14 includes a shift register. The shift register is configured to start an operation in response to a trigger signal from the control device 18, sequentially select the drive electrode Td in order along the vertical scanning direction, and output a pulse to the selected drive electrode Td.

Note that, similarly to the scanning signal lines, the plurality of drive electrodes are extended in the horizontal direction and arrayed in the vertical direction in the TFT substrate. Therefore, it is preferred that the sensor drive circuit 14 and the scanning line drive circuit 8 be arranged along vertical sides of a rectangular region (display region) in which the pixels are arrayed. In view of this, the scanning line drive circuit 8 is disposed on one of the right and left sides, and the sensor drive circuit 14 is disposed on the other side.

The signal detection circuit 16 is the above-mentioned voltage detection circuit, and is connected to the detection electrode group. The signal detection circuit 16 may be configured to monitor the voltages of the detection electrode group in a parallel manner by providing a voltage detection circuit for each of the detection electrodes, or may be configured to monitor the voltages of the plurality of detection electrodes in a time division manner within a time period in which a pulse applied to the drive electrode is maintained by providing a single voltage detection circuit for the plurality of detection electrodes, for example.

The contact position of an object on the display surface is determined based on at which detection electrode Ts a contact voltage is detected when the pulse is applied to which drive electrode Td, and the intersection between those drive electrode Td and detection electrode Ts is calculated as a contact position. The contact position may be calculated by a circuit or an arithmetic device provided in the liquid crystal display device 2. Alternatively, information representing the detection electrode Ts from which contact voltage is detected and the drive electrode Td which is driven at this time may be output from the liquid crystal display device 2 to perform calculation processing of the contact position in an external circuit or arithmetic device.

The control device 18 includes an arithmetic processing circuit such as a central processing unit (CPU) and a memory such as a read only memory (ROM) and a random access memory (RAM). The control device 18 receives video data. For example, when the liquid crystal display device 2 constructs a display part of a computer or a mobile terminal, video data is input from the computer or the like as the main body to the liquid crystal display device 2. Further, when the liquid crystal display device 2 constructs a television set, video data is received by an antenna or tuner (not shown). The control device 18 executes various processing by controlling the CPU to read and execute a program stored in the memory. Specifically, the control device 18 is configured to subject the video data to various image signal processing such as color adjustment to generate a video signal representing a grayscale value of each pixel, and output the video signal to the video line drive circuit 10. Further, the control device 18 is configured to generate, based on the input video data, a timing signal so that the scanning line drive circuit 8, the video line drive circuit 10, the backlight drive circuit 12, the sensor drive circuit 14, and the signal detection circuit 16 may synchronize with each other, and output the timing signal to those circuits. Further, the control device 18 is configured to generate, based on the input video data, a signal for controlling the brightness of the LEDs as the emission control signal to the backlight drive circuit 12 in addition to the timing signal.

Note that, the scanning line drive circuit 8, the video line drive circuit 10, the sensor drive circuit 14, and the signal detection circuit 16 may be formed in the TFT substrate together with the TFTs in the display region and the like. Alternatively, those circuits 8, 10, 14, and 16 may be manufactured on a separate integrated circuit (IC), and the IC may be mounted on the TFT substrate or a flexible printed circuit (FPC) connected to the TFT substrate.

Figure 2:
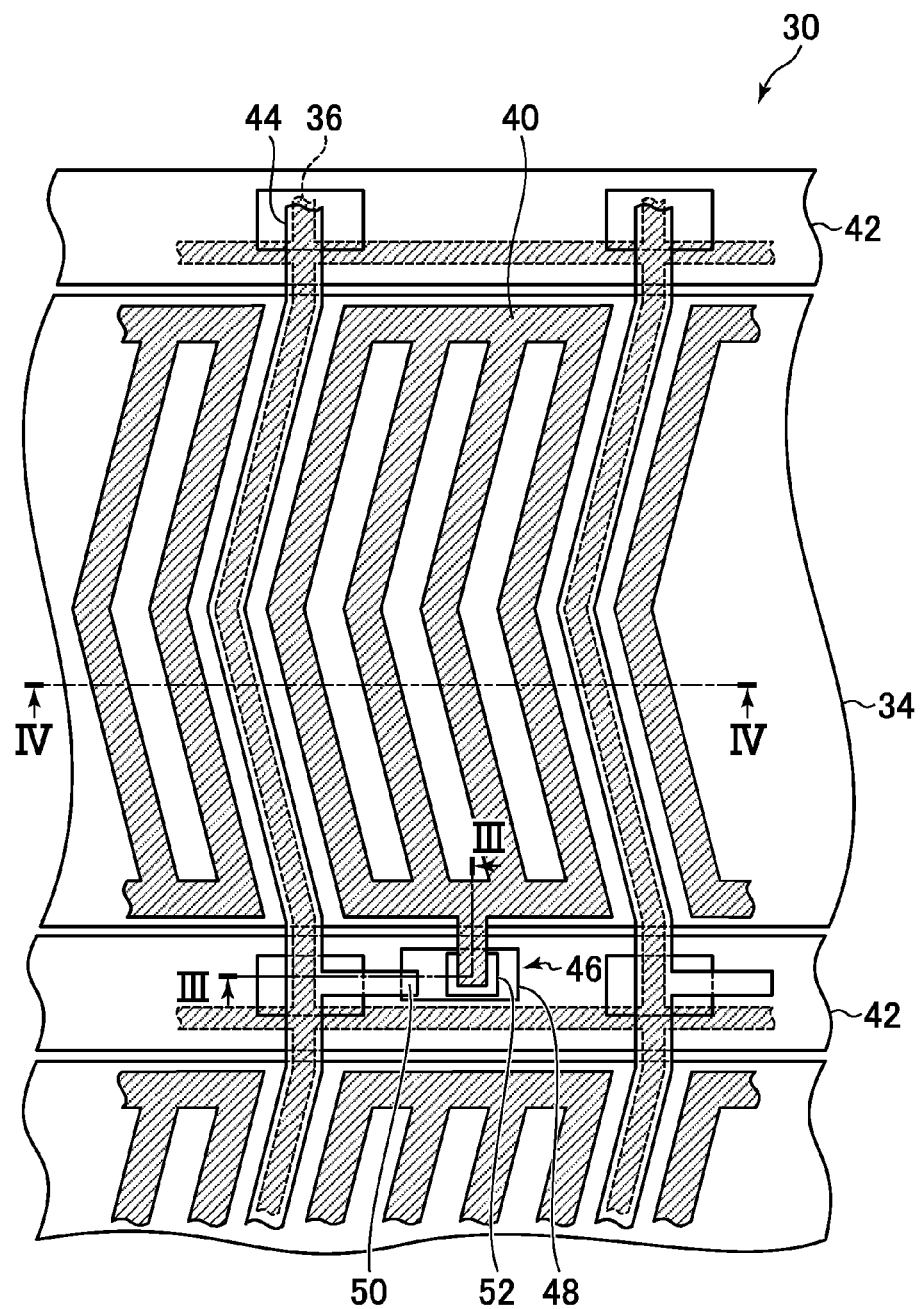
FIG. 2 is a partial plan view illustrating a schematic layout of components in a display region of a TFT substrate in the liquid crystal display device according to the first embodiment.

FIG. 2 is a partial plan view illustrating a schematic layout of components in the display region of the TFT substrate 30, which illustrates a state in which the TFT substrate 30 is viewed from the liquid crystal side. In the display region, a plurality of pixels is arrayed in matrix. FIG. 2 illustrates a pixel region corresponding to one pixel and a region in its vicinity. The liquid crystal panel 4 employs an in-plane switching (IPS) system, and the pixel electrode and the common electrode are both formed in the TFT substrate 30. On a surface of the glass substrate of the TFT substrate 30 on the liquid crystal side, there are laminated a pixel electrode 40, a common electrode, a gate line 42 (scanning signal line Py), a drain line 44 (video signal line Px), a TFT 46, the drive electrode 34, and the like. A detection electrode 36 is laminated on an outward-directed surface of the glass substrate of the TFT substrate 30, in other words, on a surface on which an image is displayed.

The pixel region has a part (effective pixel region) through which light from the backlight unit 6 transmits. In this part, the pixel electrode 40 is disposed, which is made of a transparent conductive material such as indium tin oxide (ITO) or indium zinc oxide (IZO). And, in this embodiment, the common electrode made of a transparent conductive material such as ITO or IZO is formed across almost the entire display region of a layer below the pixel electrode 40. The pixel electrode 40 is formed into a shape having slits or into a comb shape so that an electric field generated between the pixel electrode and the common electrode can reach the liquid crystal in the effective pixel region.

Further, the pixel region has a boundary region surrounding the effective pixel region. The boundary region separates the pixel electrodes 40 of the adjacent pixels from each other. In this region, the gate line 42 (scanning signal line Py) and the drain line 44 (video signal line Px) are arranged, and the TFT 46 is disposed in the vicinity of the intersection of those lines. Further, in the present invention, the drive electrode 34 is disposed along the boundary region between the pixel electrodes.

The TFT 46 includes a semiconductor layer 48, and a drain electrode 50 and a source electrode 52 that are brought into Ohmic contact with the semiconductor layer 48. The drain electrode 50 is connected to the drain line 44. The source electrode 52 is connected to the pixel electrode 40 via a contact hole. The semiconductor layer 48 overlaps with the gate line 42 in a region including a gap part between the drain electrode 50 and the source electrode 52. The gate line 42 in this part functions as a gate electrode of the TFT 46.

The drive electrode 34 is extended in the horizontal direction in a region between the gate lines 42. The detection electrode 36 is formed to have a mesh pattern composed of a conductive film disposed along the boundary region, for example.

Figure 3:
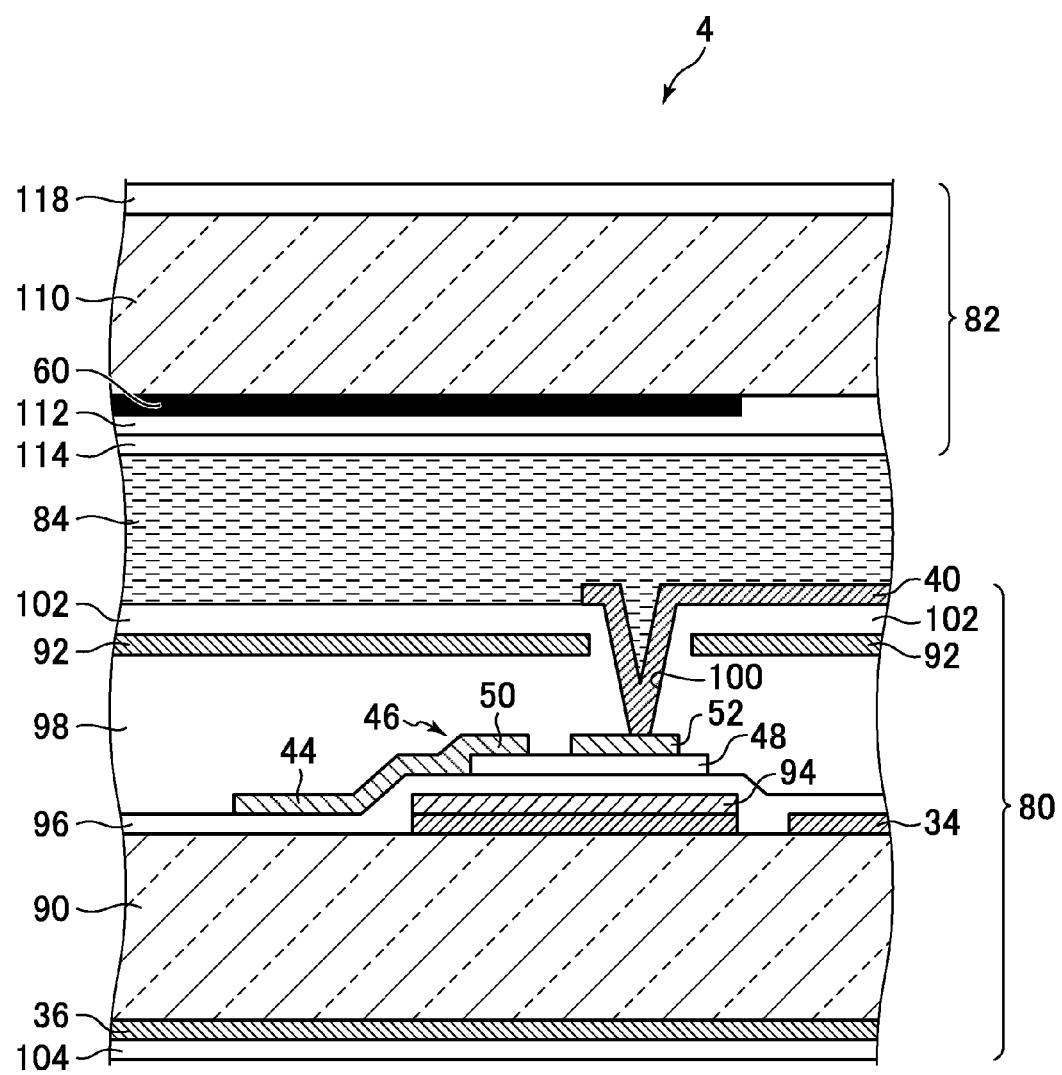
FIG. 3 is a schematic vertical sectional view of a liquid crystal panel taken along the line III-III illustrated in FIG. 2.
Figure 4:
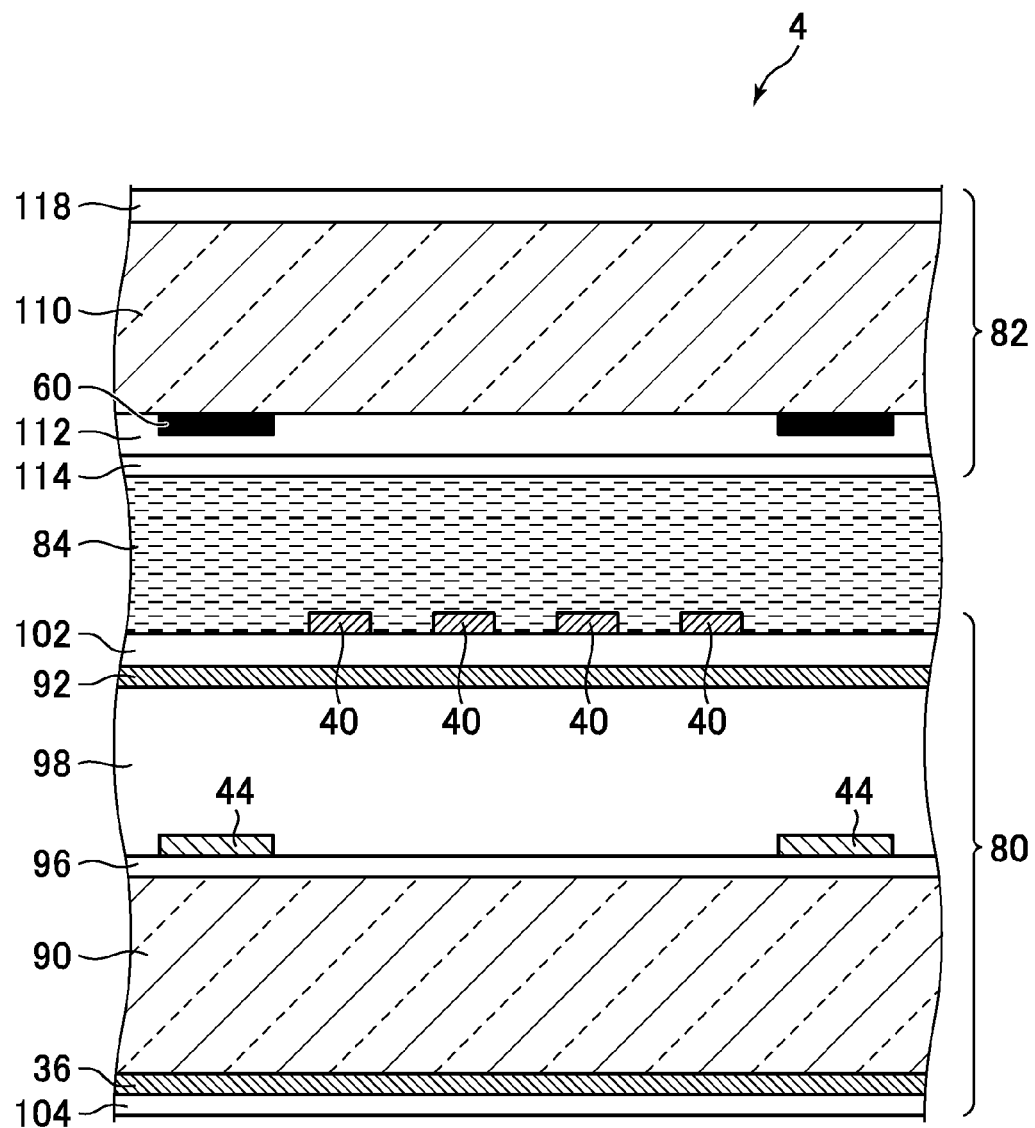
FIG. 4 is a schematic vertical sectional view of the liquid crystal panel taken along the line IV-IV illustrated in FIG. 2.

FIG. 3 is a schematic vertical sectional view of the liquid crystal panel 4 taken along the line illustrated in FIG. 2, and FIG. 4 is a schematic vertical sectional view of the liquid crystal panel 4 taken along the line IV-IV illustrated in FIG. 2. The liquid crystal panel 4 has a structure in which liquid crystal 84 is sandwiched between a laminate 80 on the TFT substrate side and a laminate 82 on the opposing substrate side.

The laminate 80 on the TFT substrate side includes the pixel electrode 40, a common electrode 92, the TFT 46, the gate line 42, the drain line 44, the drive electrode 34, the detection electrode 36, and the like, which are laminated on a surface of a glass substrate 90 on the liquid crystal 84 side. In this embodiment, the TFT 46 is an inversely staggered (bottom gate) TFT, and a gate electrode 94 is formed in a layer below a layer in which the drain electrode 50 and the source electrode 52 are formed. Note that, the TFT 46 may be a staggered TFT.

On the glass substrate 90, a transparent conductive film made of ITO, IZO, or the like is laminated, and a metal film is further laminated thereon. Those transparent conductive film and metal film are patterned to form the gate line 42 and the gate electrode 94 (in the following, both of them are collectively referred to simply as "gate"), and the drive electrode 34. The gate has a two-layer structure including the transparent conductive film and the metal film, and the drive electrode 34 has a single-layer structure including the transparent conductive film. The metal film and the transparent conductive film are patterned into different shapes. However, since a region in which the metal film remains is completely included in a region in which the transparent conductive film remains, and therefore, with use of a half exposure mask, the metal film and the transparent conductive film can be patterned through one exposure step.

A gate insulating film 96 made of, for example, $SiO_2$, SiN, or the like is formed so as to cover the gate line 42, the gate electrode 94, and the drive electrode 34.

On the gate insulating film 96, the semiconductor layer 48 made of, for example, amorphous silicon or polysilicon is formed. On the semiconductor layer 48, a metal layer is laminated, which is patterned to form the drain line 44, the drain electrode 50, and the source electrode 52. The drain electrode 50 and the source electrode 52 are each formed so as to be held in contact with the semiconductor layer 48.

On the metal layer forming the drain line 44 and the like, a protective insulating layer 98 is formed, and a transparent conductive film made of ITO, IZO, or the like is further laminated thereon. This transparent conductive film is patterned to form the common electrode 92. In this embodiment, the common electrode 92 is basically disposed across the entire display region, but has an opening formed in a part that forms a contact hole 100 to the source electrode 52.

On the common electrode 92, an interlayer insulating film 102 is laminated. Above the source electrode 52, the contact hole 100 passing through the interlayer insulating film 102 and the protective insulating layer 98 is formed. Then, on the interlayer insulating film 102, a transparent conductive film similar to that of the common electrode 92 is laminated. This transparent conductive film is patterned to form the pixel electrode 40. The pixel electrode 40 is connected to the source electrode 52 via the contact hole 100.

On the outward-directed surface of the glass substrate 90, a transparent conductive film made of ITO, IZO, or the like is laminated. This transparent conductive film is patterned to form the detection electrode 36, and a polarizing plate 104 is bonded thereon.

The laminate 82 on the opposing substrate side includes the black matrix 60 formed of a light shielding film laminated on a surface of a glass substrate 110 on the liquid crystal 84 side. The black matrix 60 is formed in the boundary region surrounding the effective pixel region. After the black matrix 60 is formed, a color filter 112 is formed, and an overcoat layer 114 made of a transparent material is further laminated thereon. On a back surface of the glass substrate 110, in other words, on a surface opposite to the liquid crystal 84, the polarizing plate 118 is bonded.

Figure 5:
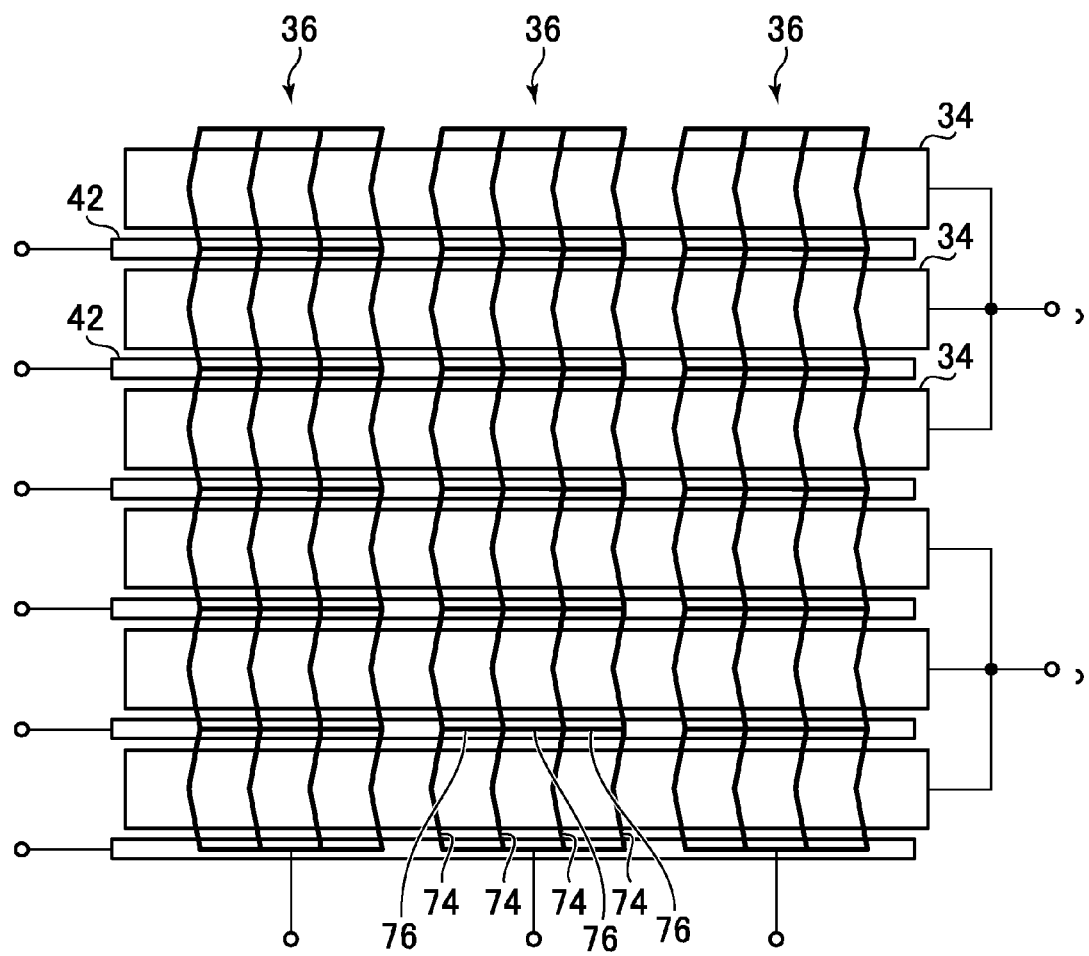
FIG. 5 is a plan view schematically illustrating shapes of a drive electrode and a detection electrode in the liquid crystal display device according to the first embodiment.

FIG. 5 is a plan view schematically illustrating the shapes of the drive electrode 34 and the detection electrode 36. The drive electrode 34 and the detection electrode 36 are respectively extended in directions along the display surface, but those directions differ from each other. Specifically, in this embodiment, each of the drive electrodes 34 has an elongated shape extending in a lateral direction (horizontal direction), and the plurality of drive electrodes 34 are arrayed in a longitudinal direction (vertical direction) in the TFT substrate 30. On the other hand, each of the detection electrodes 36 has an elongated shape extending in the longitudinal direction, and the plurality of detection electrodes 36 are arrayed in the lateral direction in the TFT substrate 30. With this arrangement of both the electrodes, the drive electrodes 34 and the detection electrodes 36 form opposing parts at a plurality of positions arrayed in matrix, in other words, arrayed two-dimensionally in the display surface.

The drive electrode 34 is formed of a transparent conductive film, and hence the drive electrode 34 can be disposed in the effective pixel region. In this case, when the capacitance between the detection electrode 36 and the common electrode 92 is increased, the difference in voltage change in the detection electrode 36 between when an object is brought into contact and when an object is not brought into contact is reduced. In this embodiment, the drive electrode 34 functions as a shield for weakening the capacitance coupling between the detection electrode 36 and the common electrode 92, to thereby obtain an effect of preventing reduction of the difference in voltage change in the detection electrode 36. In order to increase the effect, it is desired to minimize the gap formed between the drive electrode 34 and the gate, from which the transparent conductive film is removed. Therefore, the width of the drive electrode 34 disposed between the adjacent gate lines 42 is substantially the size of the effective pixel region in the vertical direction, and the drive electrode 34 is generally formed into a stripe shape thicker than the pixel boundary.

One or both of right and left ends of the drive electrode 34 are each led out from the image display region to be connected to the sensor drive circuit 14. In this embodiment, as described above, the sensor drive circuit 14 is disposed on the right side of the display region, and each of the plurality of drive electrodes 34 has its right end led out from the image display region so as to be supplied with a drive pulse from the sensor drive circuit 14. In general, the position resolution required for contact detection is larger than the pixel size, and hence the plurality of stripe-shaped drive electrodes 34 arrayed successively in the vertical direction may be bunched to be driven as a single drive electrode. With this, the sensor drive circuit 14 is simplified.

One or both of upper and lower ends of the detection electrode 36 are each led out from the image display region to be connected to the signal detection circuit 16. For example, in FIG. 1, the lower end of the detection electrode 36 is led out from the display region to be connected to the signal detection circuit 16.

The detection electrode 36 is formed of a transparent conductive film, and hence the detection electrode 36 may be basically disposed in any one of the effective pixel region and the pixel boundary region. In this case, as the capacitance C0 at the opposing part between the detection electrode 36 and the drive electrode 34 is increased, the time constant of the pulse induced in the detection electrode 36 due to the application of a drive pulse to the drive electrode 34 is increased. In view of this point, it may become easy to determine the voltage difference between the contact state and the non-contact state through threshold determination. On the other hand, as the value of the ratio of C0 with respect to the capacitance C1 between the contact object and the detection electrode 36 is increased, the voltage difference between the contact state and the non-contact state is reduced. Therefore, in view of this point, it may become difficult to determine the voltage difference. Therefore, in view of those points, the shape of the detection electrode 36 is set so that the capacitance C0 takes a preferred value. For example, the area of the opposing part between the detection electrode 36 and the drive electrode 34 is set so that the value of the ratio between C1 and C0 is about 1. C1 is relatively small, and hence the detection electrode 36 may be formed into, for example, a mesh shape or a thin stripe shape. Note that, when the electric resistance of the detection electrode 36 is increased, insufficiency in accuracy of contact detection may be caused because the waveform may be deteriorated before the voltage change caused in the detection electrode 36 at the opposing part reaches the end on the signal detection circuit 16 side. Therefore, the shape of the detection electrode 36 is preferred to be determined considering also this point.

In this embodiment, as illustrated in FIGS. 2 and 5, the detection electrode 36 is formed into a mesh pattern along the pixel boundary. Specifically, one detection electrode 36 has a pattern basically including a plurality of main line electrodes 74 extending so as to cross the display region in the vertical direction, and short branch line electrodes 76 for bridging the main line electrodes 74 in the lateral direction. The plurality of main line electrodes 74 are bunched, and those main line electrodes 74 are connected to each other by the branch line electrodes 76 so as to reduce the electric resistance of the detection electrode 36.

In this embodiment, the number Ns of the mainline electrodes 74 forming the mesh shape of each detection electrode 36 determines the size of each opposing part in the lateral direction. Further, the size of the opposing part determines the position resolution in contact detection. Therefore, the number Ns of the main line electrodes to be bunched is determined considering a desired resolution of the contact position as well as the above-mentioned capacitance C0 and electric resistance.

The detection electrode 36 is laminated on the image display surface. Therefore, the mesh-shaped detection electrode 36 basically having an opening in the effective pixel region may reduce attenuation of transmitted light of the liquid crystal panel 4, to thereby enable further clear image display. Note that, image display is possible even when the mesh-shaped detection electrode 36 having an opening in the effective pixel region is not transparent, and hence a metal may be used for the detection electrode to reduce the resistance.

Note that, an electrode for electrostatic shielding may be formed in a gap between the detection electrodes 36. An object that is brought into contact with the display surface may affect an electric field generated by the pixel electrode and the common electrode, to thereby cause color or grayscale shift in the image display at the contact position. Further, the static electricity of the object may damage the TFT 46. In view of this, an electrostatic shielding electrode whose potential is fixed is disposed on the outward-directed surface of the TFT substrate 30 so as to achieve electrostatic shielding between the liquid crystal 84 and the contact object or between the TFT 46 and the contact object. The electrostatic shielding electrode is preferred to have a ground potential, for example.

Next, the drive of the liquid crystal panel 4 is described. As described above, the timing of image display on the liquid crystal panel 4 and the timing of touch sensor drive are controlled by the control device 18. Specifically, the control device 18 sends a trigger signal to start the operation of the shift register to the scanning line drive circuit 8 at a start timing of each frame of an image. With this, the scanning line drive circuit 8 sequentially selects the gate line 42 in a horizontal scanning period (1H), and starts an operation of outputting a scanning pulse to the selected gate line 42.

The video line drive circuit 10 receives, from the control device 18, a video signal for the selected row in synchronization with the selection of the gate line 42 by the scanning line drive circuit 8, and generates a pixel voltage corresponding to a pixel value of each pixel of the selected row to output the pixel value to the drain line 44. With this, the pixel voltage is applied to the pixel electrode 40 corresponding to the selected gate line 42.

Each pixel holds the pixel voltage applied to the pixel electrode 40 in a capacitor formed of the pixel electrode 40 and the common electrode 92. Specifically, the pixel electrode 40 is charged based on a voltage difference between the pixel voltage and the potential of the common electrode 92. Therefore, the potential of the common electrode 92 needs to be fixed in the effective display period. Therefore, in the related-art liquid crystal display device that uses the common electrode of the liquid crystal panel so as to double as the drive electrode for contact detection to achieve an in-cell touch sensor function, the contact is detected during the vertical blanking period.

In contrast, in the liquid crystal display device 2, the drive electrode 34 and the detection electrode 36 of the touch sensor are separately provided from the electrodes (common electrode 92 and pixel electrode 40) used for image display. Therefore, the operation of the touch sensor, in other words, application of a drive pulse to the drive electrode 34 and detection of voltage change in the detection electrode 36 can be basically performed independently of the operation for image display. Therefore, the liquid crystal display device 2 can detect the contact in a vertical scanning period (1V) even in the effective display period in addition to the vertical blanking period.

The effective display period occupies most of the vertical scanning period. Therefore, when the contact detection can be performed independently of the image display, first, a width of the drive pulse can be increased in scanning of sequentially applying the drive pulse to the plurality of drive electrodes 34 formed in the display region. By increasing the width of the drive pulse, it is possible to reduce the influence of waveform rounding of the drive pulse in the drive electrode 34 and the waveform rounding of a pulse induced in the detection electrode 36 on the voltage change monitored by the signal detection circuit 16. Further, it is possible to improve voltage measurement accuracy because the measuring time in the signal detection circuit 16 increases. Therefore, the accuracy in contact detection based on the voltage change in the detection electrode 36 improves. In particular, in a system in which the signal detection circuit 16 sequentially monitors the voltage changes of the plurality of detection electrodes 36 in a time division manner within each drive pulse period, increasing the width of the drive pulse is effective for improving the detection accuracy.

Further, second, performing the contact detection independently enables securing the width of the drive pulse necessary in view of detection accuracy and also increasing the scanning period of the contact detection. Thus, the time resolution in contact detection can be improved. For example, even when the scanning of sequentially applying the drive pulse to the drive electrode 34 is performed twice during the 1V period, the width of the drive pulse can be sufficiently longer as compared to the case where the scanning is performed once in the vertical blanking period. By performing the scanning for contact detection a plurality of times in the 1V period, a followable moving speed of the contact position increases.

Further, third, performing the contact detection independently enables securing the width of the drive pulse necessary in view of detection accuracy and also increasing the number of opposing parts between the drive electrodes 34 and the detection electrodes 36 formed in the display region. Thus, the position resolution in the contact detection can be improved. In inverse proportion to the increase in the number of the drive electrodes 34, the width of the drive pulse is reduced. Further, in the system in which the signal detection circuit 16 monitors the voltage changes of the plurality of detection electrodes 36 in a time division manner, as the number of the detection electrodes 36 increases, the detection time of voltage change in each detection electrode 36 reduces. However, in the present invention, the limitation on a period in which the contact can be detected is relaxed. Therefore, the number of the drive electrodes 34 and the number of the detection electrodes 36 can be increased while setting the width of the drive pulse and the detection time of the voltage change to lengths necessary for securing detection accuracy. In this manner, the number of the opposing parts can be increased. In particular, as the screen size of the liquid crystal panel 4 increases, the number of opposing parts to be formed in the display region is required to be increased. According to the present invention, this requirement can be met easily.

Note that, in this embodiment, the drive electrode 34 and the common electrode 92 electrically shield a part between the detection electrode 36 and the pixel electrode 40. Therefore, the influence of the drive of the touch sensor on the display operation of the liquid crystal panel 4, or reversely the influence of the display operation of the liquid crystal panel 4 on the operation of the touch sensor are reduced.

Second Embodiment

In the following description of a liquid crystal display device according to a second embodiment of the present invention, components similar to those in the above-mentioned first embodiment are denoted by the same reference symbols. Description of common matters is basically omitted, and differences from the above-mentioned embodiment are mainly described.

Figure 6:
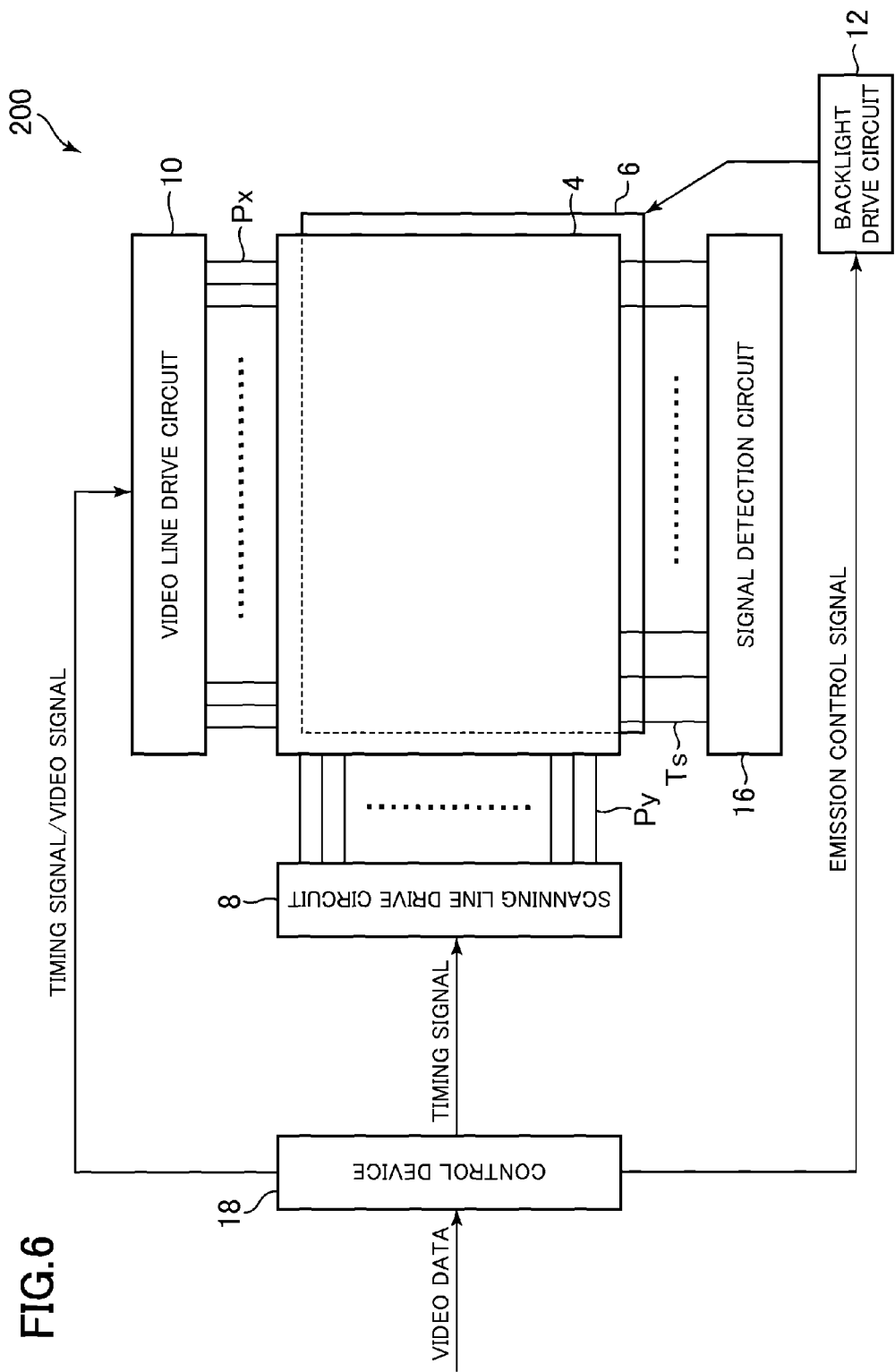
FIG. 6 is a schematic view illustrating a configuration of a liquid crystal display device according to a second embodiment of the present invention.

FIG. 6 is a schematic view illustrating the configuration of the liquid crystal display device 200 according to the second embodiment. The liquid crystal display device 200 includes the liquid crystal panel 4, the backlight unit 6, the scanning line drive circuit 8, the video line drive circuit 10, the backlight drive circuit 12, the signal detection circuit 16, and the control device 18. As described later, the liquid crystal display device 200 is configured to use a scanning pulse to be applied to the gate line 42 as a drive pulse for the drive electrode 34. In other words, the scanning line drive circuit 8 functions as an AC signal source for supplying a drive pulse to the drive electrode 34. Therefore, the liquid crystal display device 200 does not require a dedicated circuit for supplying a drive pulse to the drive electrode 34 as the sensor drive circuit 14 of the first embodiment.

Figure 7:
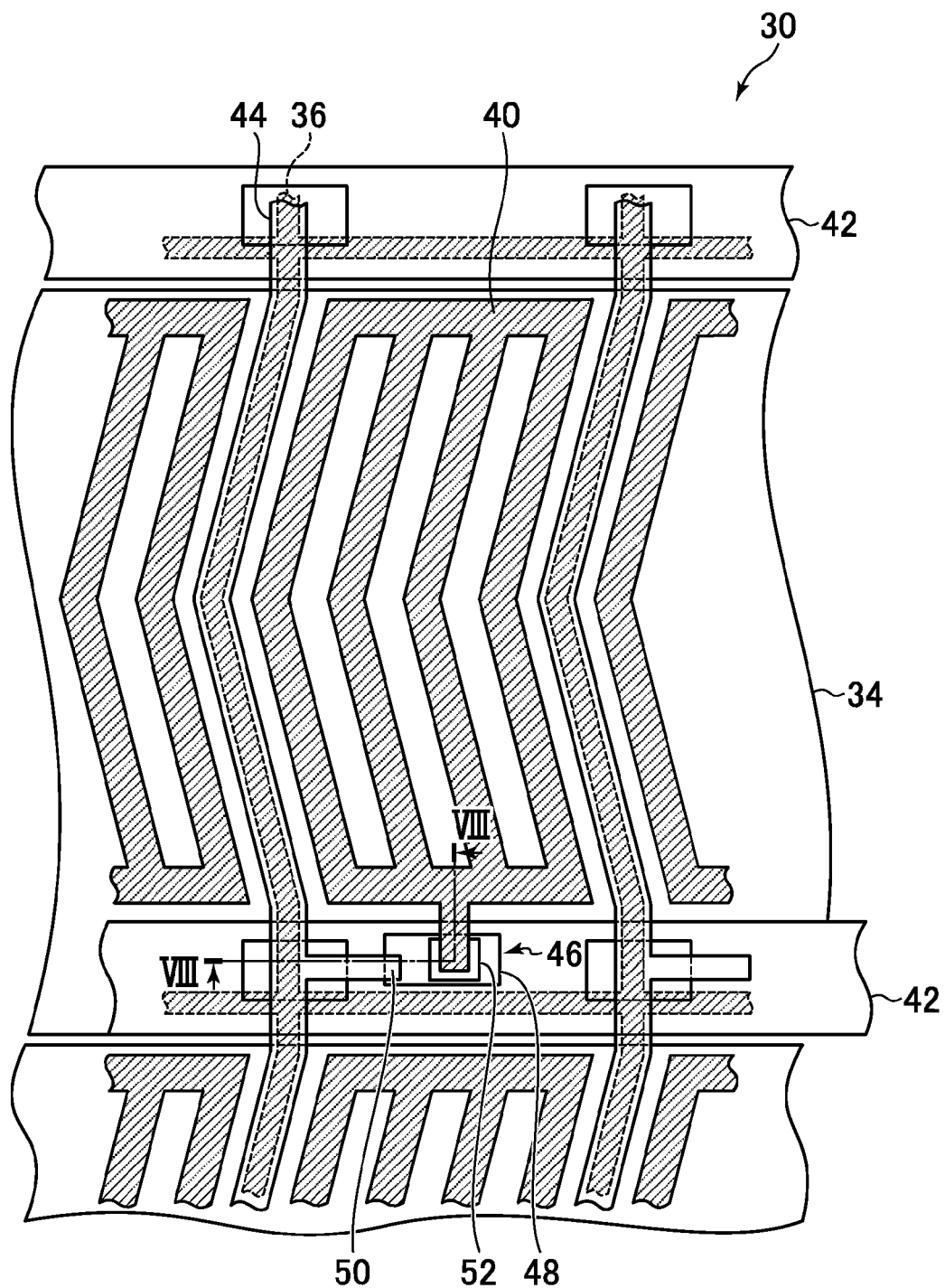
FIG. 7 is a partial plan view illustrating a schematic layout of components in a display region of a TFT substrate in the liquid crystal display device according to the second embodiment.

FIG. 7 is a partial plan view illustrating a schematic layout of components in the display region of the TFT substrate 30 in the liquid crystal display device 200, and similarly to FIG. 2, illustrates a state in which the TFT substrate 30 is viewed from the liquid crystal side. The configuration illustrated in FIG. 7 differs from that illustrated in FIG. 2 in that the drive electrode 34 extending in the horizontal direction is electrically connected to one of the two adjacent gate lines 42. For example, in this embodiment, the drive electrode 34 is connected to the gate line 42 that selects the pixel row in which the drive electrode 34 is disposed.

Figure 8:
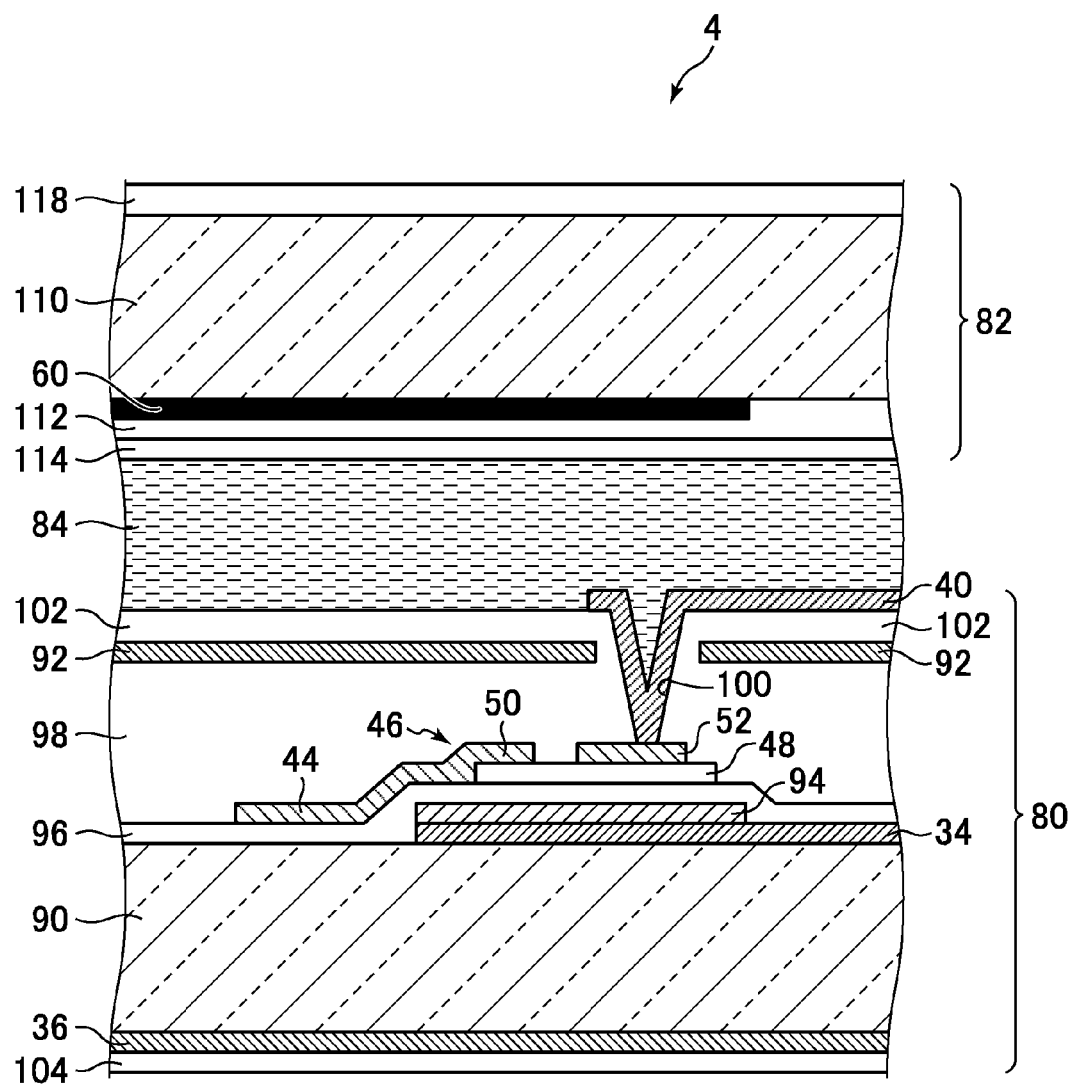
FIG. 8 is a schematic vertical sectional view of a liquid crystal panel taken along the line VIII-VIII illustrated in FIG. 7.

FIG. 8 is a schematic vertical sectional view of the liquid crystal panel 4 taken along the line VIII-VIII illustrated in FIG. 7. The structure illustrated in FIG. 8 differs from the structure illustrated in FIG. 3 in that the transparent conductive film forming the drive electrode 34 is formed continuously to the transparent conductive film forming the lower layer of the gate electrode 94 having a two-layer structure. The transparent conductive film of the drive electrode 34 may be formed continuously to the transparent conductive film of the gate line 42 disposed along the lower side of the drive electrode 34 not only in the part of the TFT 46 in which the gate electrode 94 is formed as illustrated in FIG. 8.

Note that, the cross section of the structure illustrated in FIG. 7 at a position corresponding to the line IV-IV of FIG. 2 is the same as that in FIG. 4.

Figure 9:
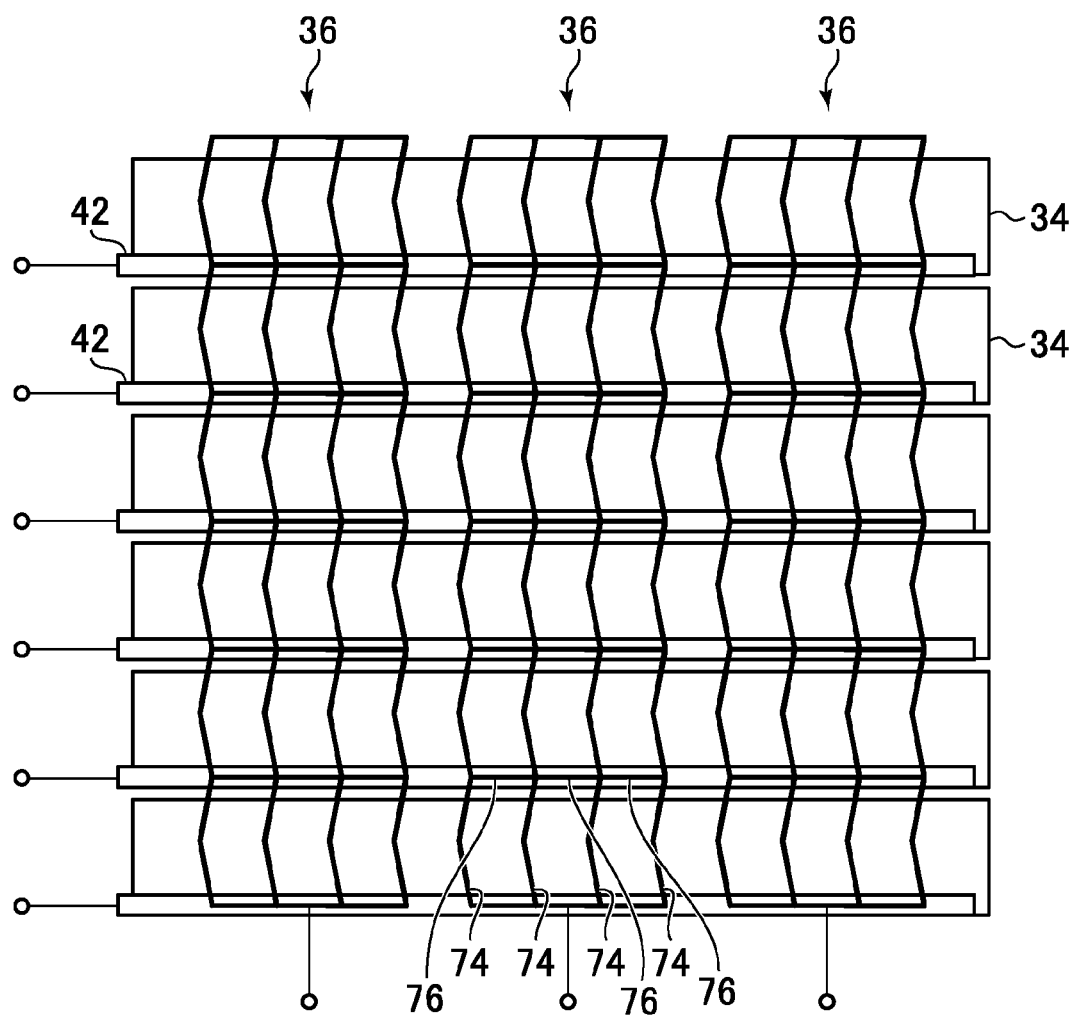
FIG. 9 is a plan view schematically illustrating shapes of a drive electrode and a detection electrode in the liquid crystal display device according to the second embodiment.

FIG. 9 is a plan view schematically illustrating the shapes of the drive electrode 34 and the detection electrode 36. As described above referring to FIG. 8, the drive electrode 34 is formed continuously to the transparent conductive film forming the lower layer of the gate line 42. This point differs from the structure illustrated in FIG. 5. The drive electrode 34 is applied with a scanning pulse from the scanning line drive circuit 8 together with the gate line 42, and hence the sensor drive circuit and lead lines to the sensor drive circuit are unnecessary. Because the sensor drive circuit is unnecessary, the scanning line drive circuit 8 may be easily disposed on both right and left sides of the display region. In other words, in the liquid crystal panel 4 of the liquid crystal display device 200, the gate line 42 and the drive electrode 34 can be driven from both right and left sides, and the waveform rounding of a scanning pulse applied to the gate electrode 94 and a drive pulse applied to the drive electrode 34 can be reduced. Therefore, for example, image display at high frame rate and contact detection at high accuracy are possible. Note that, by increasing the frame rate, the time resolution in contact detection can be increased.

Next, the difference from the first embodiment in the drive of the liquid crystal panel 4 is described. As described above, each drive electrode 34 is connected to the gate line 42 adjacent thereto, and the touch sensor operates with use of a scanning pulse to be applied to the gate line 42 as the drive pulse. Therefore, the touch sensor of the liquid crystal panel 4 of this embodiment can use the effective display period of the vertical scanning period of the video signal to be displayed on the liquid crystal panel 4 for contact detection similarly to the liquid crystal panel 4 of the first embodiment. This point differs from the related-art in-cell type touch sensor that performs contact detection during the vertical blanking period.

If the contact detection can be performed in the effective display period that occupies most of the vertical scanning period, as described in the first embodiment, the detection accuracy can be improved by increasing the width of the drive pulse.

Note that, the liquid crystal panel 4 of the first embodiment can perform contact detection also during the blanking period, but the liquid crystal panel 4 of this embodiment does not perform contact detection during the blanking period.

Modified Examples

The liquid crystal display device according to the present invention can be configured differently from that described in the embodiment above. In the following, the other configurations are described. Note that, components similar to those in the above-mentioned embodiments are denoted by the same reference symbols. Description of common points is basically omitted, and differences from the above-mentioned embodiments are mainly described. Note that, the configurations below are part of modified examples of the liquid crystal display device according to the present invention, and the present invention is not limited to the embodiments described above and the modified examples described below.

(1) The configuration of the first embodiment may be changed to a configuration in which the drive electrode 34 is disposed on the outward-directed surface of the TFT substrate 30 and the detection electrode 36 is disposed on the surface of the TFT substrate 30 on the liquid crystal side. In this configuration, the capacitance between the detection electrode 36 and the common electrode 92 increases, and hence the difference in voltage change in the detection electrode 36 between when the object is brought into contact and when the object is not brought into contact is reduced as compared to the configuration of the first embodiment. However, as described above, the detection accuracy is improved by increasing the detection time of voltage change, and hence contact detection is possible also with this configuration.

(2) In the above-mentioned embodiments, it is described that the shape of the detection electrode 36 may be formed into a mesh shape or a thin stripe shape as an example considering the ratio between C1 and C0 and the resistance of the detection electrode 36. Here, as described above, the detection electrode 36 is formed of a transparent conductive film, and hence the detection electrode 36 may be basically disposed in any one of the effective pixel region and the pixel boundary region. Therefore, the detection electrode 36 may have, for example, a stripe shape thicker than the pixel boundary region so as to be disposed in the effective pixel region. Such a configuration can reduce the resistance of the detection electrode 36. On the other hand, in this configuration, the value of the ratio of C0 with respect to C1 may increase, and hence the voltage change caused in the detection electrode 36 may reduce. However, according to the present invention, as described above, the detection accuracy is improved by increasing the detection time of voltage change, and hence contact detection is possible also with this configuration.

(3) In each of the above-mentioned embodiments, the liquid crystal display device 2 includes the liquid crystal panel 4 employing the IPS system with a structure in which the pixel electrode 40 is laminated above the common electrode 92 (hereinafter referred to as "STOP structure"). The present invention is also applicable to a liquid crystal display device using a liquid crystal panel employing other systems. Specifically, the liquid crystal panel 4 may employ an IPS system with a structure in which the common electrode 92 is laminated above the pixel electrode 40 (hereinafter referred to as "CTOP structure"). Further, other systems may be employed such as a vertical alignment (VA) system in which the pixel electrode 40 is disposed in the TFT substrate 30 and the common electrode 92 is disposed in the opposing substrate.

(4) In the liquid crystal panel 4 of the first embodiment, the drive electrode 34 and the lower layer of the gate (gate electrode 94 and gate line 42) having a two-layer structure are formed of a common conductive film, and the drive electrode 34 and the gate are formed with use of a half exposure mask, which provides an advantage of simplifying the manufacturing process. Alternatively, the drive electrode 34 and the gate may be formed by different photolithography steps. For example, after the drive electrode 34 is formed of a transparent conductive film, an insulating film may be laminated thereon, and a gate of a metal film may be formed thereon. With this, the edge of the drive electrode 34 may overlap the edge of the gate, to thereby improve the effect of electrostatic shielding between the detection electrode 36 and the common electrode 92 by the drive electrode 34.

(5) In the above-mentioned embodiments, each detection electrode 36 intersects with the plurality of drive electrodes 34 extending in the horizontal direction. However, the detection electrode 36 may be formed as, for example, a plurality of mesh electrodes arrayed in matrix so that each detection electrode 36 forms the opposing part with only one of the drive electrodes 34. In this configuration, the detection electrode 36 is an individual electrode for each opposing part, and a signal line is led out for each opposing part from the detection electrode 36 to the signal detection circuit 16.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
a liquid crystal panel in which liquid crystal is sandwiched between a front substrate and a back substrate arranged so as to oppose each other, the front substrate having an outward-directed surface as a display surface of an image, the outward-directed surface being a surface opposite to a surface of the front substrate facing the liquid crystal;
a pixel electrode formed of a transparent conductive film laminated between the front substrate and the liquid crystal; and
scanning wiring lines laminated between the front substrate and the pixel electrode and respectively extended along a plurality of pixel rows forming the image;
the liquid crystal display device being configured to:
sequentially apply a selection signal to scanning wiring lines to thereby enable application of a voltage based on a video signal to each pixel electrode of corresponding one of the plurality of pixel rows; and
control alignment of the liquid crystal by an electric field generated between the pixel electrode and a common electrode, to thereby form the image; the liquid crystal display device further comprising a capacitive touch sensor comprising:
a plurality of first electrodes formed of a transparent conductive film patterned in a same layer as the scanning wiring lines, the plurality of first electrodes being formed in regions between the scanning wiring lines;
a plurality of second electrodes formed of a transparent conductive film laminated on the outward-directed surface of the front substrate; and
a contact detection circuit configured to, when one of each of the plurality of first electrodes and each of the plurality of second electrodes is defined as a drive electrode and another thereof is defined as a detection electrode:
supply a drive signal to the drive electrode to cause a voltage change;

detect, based on the voltage change in the detection electrode caused by the supply, a change in capacitance in an opposing part between corresponding one of the plurality of first electrodes and corresponding one of the plurality of second electrodes; and detect contact of an object to the display surface near the opposing part, wherein the common electrode is formed of a transparent conductive film laminated between the pixel electrode and the plurality of first electrodes.

2. The liquid crystal display device according to claim 1, wherein the first electrodes comprise the drive electrode and cover the regions between the scanning wiring lines.

3. The liquid crystal display device according to claim 2, wherein the detection electrodes are formed into mesh shape.

4. The liquid crystal display device according to claim 1, wherein the contact detection circuit operates to detect the contact of the object in an effective display period of the video signal.

5. The liquid crystal display device according to claim 1, wherein the plurality of first electrodes extends in a first direction along the display surface, and the plurality of second electrodes extends in a second direction different from the first direction along the display surface, the plurality of first electrodes and the plurality of second electrodes forming the opposing parts at a plurality of positions arrayed two-dimensionally in the display surface, and wherein the contact detection circuit is further configured to sequentially supply the drive signal to a plurality of the drive electrodes to examine the voltage change in each of the detection electrodes, to thereby determine a position at which the object is brought into contact in the display surface.

6. The liquid crystal display device according to claim 1, wherein the pixel electrode, the common electrode, the scanning wiring lines, and the plurality of first electrodes, and the plurality of second electrodes are aligned in this order when viewed from a light source side toward the display surface.

7. The liquid crystal display device according to claim 1, wherein when a selection signal is sequentially applied to the scanning wiring lines, the contact detection circuit is configured to:

supply a drive signal to the drive electrode that causes a voltage change;

detect, based on the voltage change in the detection electrode, a change in capacitance in the opposing part between a corresponding one of the plurality of first electrodes and one of the plurality of second electrodes; and detect contact of an object to the display surface near the opposing part.

8. A liquid crystal display device, comprising:

a liquid crystal panel in which liquid crystal is sandwiched between a front substrate and a back substrate arranged so as to oppose each other, the front substrate having an outward-directed surface as a display surface of an image, the outward-directed surface being a surface opposite to a surface of the front substrate facing the liquid crystal;

a pixel electrode formed of a transparent conductive film laminated between the front substrate and the liquid crystal;

scanning wiring lines laminated between the front substrate and the pixel electrode and respectively extended along a plurality of pixel rows forming the image;

the liquid crystal display device being configured to:
sequentially apply a selection signal to scanning wiring lines to thereby enable application of a voltage based on a video signal to each pixel electrode of corresponding one of the plurality of pixel rows; and control alignment of the liquid crystal by an electric field generated between the pixel electrode and a common electrode, to thereby form the image;

the liquid crystal display device further comprising a capacitive touch sensor comprising:

a plurality of drive electrodes formed of a transparent conductive film patterned in a same layer as the scanning wiring lines, the plurality of drive electrodes being electrically connected to the scanning wiring lines, respectively;

a plurality of detection electrodes formed of a transparent conductive film laminated on the outward-directed surface of the front substrate; and a contact detection circuit configured to detect a change in capacitance in an opposing part between corresponding one of the plurality of drive electrodes and corresponding one of the plurality of detection electrodes based on a voltage change in the corresponding one of the plurality of detection electrodes caused via the corresponding one of the plurality of drive electrodes when the selection signal is applied to corresponding one of the scanning wiring lines, to thereby detect contact of an object to the display surface near the opposing part, wherein the common electrode is formed of a transparent conductive film laminated between the pixel electrode and the plurality of drive electrodes.

9. The liquid crystal display device according to claim 8, wherein the drive electrodes cover regions between the scanning wiring lines.

10. The liquid crystal display device according to claim 9, wherein the detection electrodes are formed into mesh shape.

11. The liquid crystal display device according to claim 8, wherein the plurality of drive electrodes extends in a horizontal direction in the display surface, and the plurality of detection electrodes extends in a vertical direction in the display surface, the plurality of drive electrodes and the plurality of detection electrodes forming the opposing parts at a plurality of positions arrayed two-dimensionally in the display surface, and wherein the contact detection circuit is further configured to examine the voltage change in the each of the plurality of detection electrodes when the selection signal is sequentially applied to the scanning wiring lines through vertical scanning of the image, to thereby determine a position at which the object is brought into contact in the display surface.

12. The liquid crystal display device according to claim 8, wherein the pixel electrode, the common electrode, the scanning wiring lines, and the plurality of drive electrodes, and the detection electrodes are aligned in this order when viewed from a light source side toward the display surface.

* * * * *